No. 833,624. PATENTED OCT. 16, 1906.
O. J. PETTINGER.
EYEGLASSES.
APPLICATION FILED MAR. 7, 1906.

Witnesses
Louis R. Heinrichs
A. A. Ege.

Inventor
Otto J. Pettinger
By Victor J. Evans
Attorney

UNITED STATES PATENT OFFICE.

OTTO J. PETTINGER, OF NEWBURGH, NEW YORK, ASSIGNOR TO E. BARTON WHITNEY, OF GLOVERSVILLE, NEW YORK.

EYEGLASSES.

No. 833,624.  Specification of Letters Patent.  Patented Oct. 16, 1906.

Application filed March 7, 1906. Serial No. 304,738.

*To all whom it may concern:*

Be it known that I, OTTO J. PETTINGER, a citizen of the United States, residing at Newburgh, in the county of Orange and State of New York, have invented new and useful Improvements in Eyeglasses, of which the following is a specification.

This invention relates to eyeglasses of the type having spring-arms to engage beneath the eyebrows for retaining the glasses in position upon the nose, and has for its objects to produce a comparatively simple inexpensive device of this character wherein the retaining members will be securely but detachably engaged with the nose-piece and one wherein said members may be conveniently applied to the various types of glasses now in general use.

With these and other objects in view the invention comprises the novel features of construction and combination of parts more fully hereinafter described.

Figure 1:
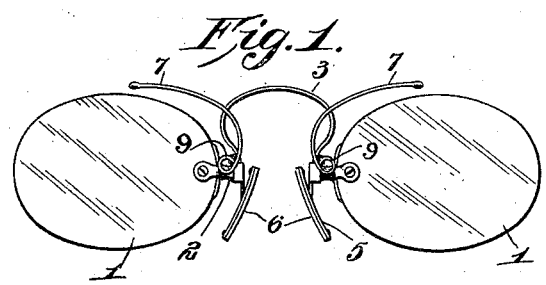
Figure 2:
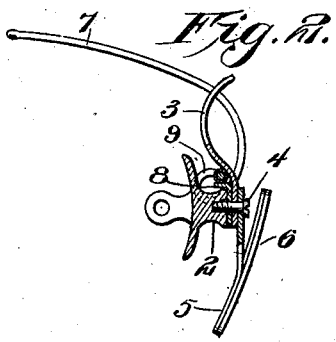

In the accompanying drawings, Figure 1 is a rear elevation of a pair of eyeglasses equipped with spring retaining members embodying the invention. Fig. 2 is an enlarged detail view, partly in section, showing the manner of connecting the retaining member with the nose-piece.

Referring to the drawings, 1 1 designate the lenses secured in base members or heads 2, connected by a spring-bow 3, terminally attached to the heads by means of fastening members or screws 4, there being also attached to the heads through the medium of said screws a pair of coöperating nose pieces or clamps 5, having their active faces suitably padded, as at 6, these parts, which are foreign to my invention, being all of the usual or any appropriate construction and material and adapted in practice to perform their ordinary functions.

The glasses are in accordance with my invention equipped with a pair of spring-retaining members or arms 7, fixed at their inner ends to base pieces or plates 8, in turn secured, respectively, to the heads 2 by means of the fastening-screws 4, there being formed at the inner ends of the retaining members, which curve upwardly and outwardly, as shown, spring-coils 9, these coils, which render the arms yieldable, being formed in the latter, preferably at their points of juncture with the base-pieces 8.

In practice the nose-pieces 5 engage the nose of the wearer as usual for holding the glasses in position, the glasses being further retained in place by engaging the outer or free ends of the retaining-arms 7 beneath the eyebrows, whereby the arms serve to hold the glasses in proper position relative to the eyes and to prevent the nose-pieces from slipping on the nose and the glasses from falling forwardly or otherwise assuming an improper or uncomfortable position.

It is apparent that the arms 7 may be readily bent to the desired shape for adjusting and properly fitting them to the wearer and, furthermore, that they may be readily applied to the various styles of glasses now in general use by means of the screws 4, which, it will be observed, serve as a common fastening means for the nose-pieces, spring-bow, and retaining-arms.

Having thus described my invention, what I claim is—

1. An eyeglass-mounting, lenses carried thereby, and spring retaining-arms detachably engaged with the mounting and adapted for engagement with the brows of the wearer, said arms being pliable and formed each with a spring-coil located between its ends.

2. An eyeglass-mounting including lens-receiving heads, and a pair of spring retaining-arms detachably engaged with said heads and adapted for engagement with the brows of the wearer, said arms being pliable and formed each with a spring-coil located between its ends.

3. In an eyeglass, a pair of lens-receiving heads, a bow connecting said heads, nose-pieces attached to the latter, base-pieces attached to the heads and spring retaining-arms carried by the base-pieces and adapted for engagement with the brows of the wearer, said arms being pliable and formed each with a spring-coil located between its ends.

4. In an eyeglass, lens-receiving heads, a spring-bow connecting said heads, a pair of coöperating nose-pieces, fastening-screws for attaching the same to the heads, base-pieces detachably secured to the heads by means of said screws, and spring retaining-arms carried by said base-pieces and adapted for engagement with the brow of the wearer, said arms being pliable and formed each with a spring-coil located between its ends.

In testimony whereof I affix my signature in presence of two witnesses.

OTTO J. PETTINGER.

Witnesses:
GRAHAM WITSCHIEF,
ELIZABETH A. FLYNN.